United States Patent [19]

Gaspard

[11] 4,265,318
[45] May 5, 1981

[54] CHUNK PICKING MACHINE

[76] Inventor: Martin Gaspard, Batchelor, La. 70715

[21] Appl. No.: 61,489

[22] Filed: Jul. 27, 1979

[51] Int. Cl.³ ............................................. A01B 43/00
[52] U.S. Cl. ................................................ 171/63
[58] Field of Search .................... 171/63–65, 171/19; 56/328 R, 220, 221, 16.1, 364

[56] References Cited

U.S. PATENT DOCUMENTS

| | | | |
|---|---|---|---|
| 2,763,975 | 9/1956 | Weigel | 171/63 |
| 2,827,969 | 3/1958 | McPherson | 171/63 |
| 4,040,489 | 8/1977 | Hulicsko | 171/63 |
| 4,059,158 | 11/1977 | Ranger | 171/63 |

FOREIGN PATENT DOCUMENTS 917822 2/1963 United Kingdom ................ 171/63

Primary Examiner—Jay N. Eskovitz
Attorney, Agent, or Firm—Llewellyn A. Proctor

[57] ABSTRACT

Apparatus for mounting on the front of a tractor, combine or other land vehicle which is useful for gathering chunks, twigs, branches or other debris from the soil. The apparatus, constituting a chunk gathering machine, is comprised generally of the combination of a rotary rake mechanism and a collection means, or pan, into which chunks, twigs, branches or other debris is swept by the rotary rake mechanism as well as means for dumping, or discharging, the collected debris.

10 Claims, 6 Drawing Figures

CHUNK PICKING MACHINE

Tillage of the soil is necessary to loosen and aerate the soil, to cover or to remove chunks, twigs, branches and other debris, and to expose a large area of fresh soil to weathering so that it can be more readily harrowed into a good seedbed, and finally, to establish a rootbed adapted to the needs of the crops to be grown. Clearing the land of trees, chunks, brush, grasses, weeds and other debris offers opportunities to materially increase agriculture production.

Unfortunately, the removal of such debris is yet largely a hand, or stoop labor job despite the continued great advancements in the use of farm machinery during this century. For example, the modern self-propelled combine, although originally developed to harvest wheat, is now used to harvest many other crops including legume and grassseeds, oats, corn and soybeans. The machine cuts, threshes, and cleans the plant product as it moves over the field. In principle, it is essentially a regular binder-type cutting device with a gathering-conveying mechanism that delivers the cut grain or soybeans to a conventional thresher modified to make it work satisfactorily when in motion working the fields. In combine harvesting the aim is usually to take the desirable part of the plant product with a minimum of the undesirable part, e.g., to take the heads of grain with a minimum of straw. It is also desirable to sever the plant close to the surface of the soil without interference from stumps, brush weeds and other debris. A higher than necessary cut would thus result in waste of the harvested plant, and a cut which was interfered with by various debris would result in another kind of waste, or even cause damage to the combine.

In the use of the combine and other secondary types of farm machinery the soil must thus be maintained clear of chunks, twigs, branches and other debris.

It is accordingly a prime objective of the present invention to provide novel apparatus, or machinery which is useful for clearing the soil, seedbed or rootbed of chunks, twigs, branches and other debris.

In particular, it is an object to provide apparatus of such character which can be mounted upon a tractor, combine or other powered land vehicle for use in gathering chunks, twigs, branches and other debris.

These objects and others are achieved in accordance with the present invention embodying apparatus which includes (a) a frame, (b) a rotary rake mechanism mounted upon said frame, said mechanism including a rotary rake per se mounted on an arm which is pivotally attached, or hinged, via an end to said frame, a motor operatively associated with said rotary rake for rotating same to sweep the surface of the soil, and means for raising and lowering said rake relative to said soil surface for sweeping same, (c) an open front pan pivotally mounted on said frame below said rotary rake mechanism for moving along the surface of the soil to collect debris swept therein by said rotary rake, and (d) means for raising said pan, and for pivoting the open front end thereof downwardly for dumping said collected debris from the pan.

The frame is comprised of vertical posts, horizontal posts, and fixed support struts extended therefrom. The arm of the rotary rake mechanism on which the rotary rake per se is mounted is preferably constituted of a pair of parallel bars of substantially equal length, one end of each of the pair of arms is pivotally attached to the frame and the rotary rake per se is rotably mounted on a spindle, or axle extended across the opposite ends of these members. The center of the arm is supported on the piston end of a hydraulic piston unit mounted on a fixed support strut, and the arm, and consequently the rotary rake, can be raised or lowered by actuation of the hydraulic piston unit.

In its preferred form, the rotary rake per se is comprised of a spindle, substantially equally spaced apart parallel bars provided with laterally projecting prongs constituting rakes held outwardly from the spindle via a plurality of webbs, and the spindle of the rotary rake is mounted across the non-hinged ends of the parallel bars forming the arm of said rotary rake mechanism. A motor, usually one mounted on the arm, is employed for rotating said rotary rake to effect the desired sweeping action.

The pan which, as suggested is pivotably attached to the frame, is preferably one provided with a beveled leading edge. The front and top of the pan are open, and the pan is closed by walls on the sides and rear. Cables are secured to the front end thereof which can be actuated via suitable motor means, e.g., a hydraulic piston unit, to raise the pan to a level position so that debris can be swept therein by the rotary rake and collected and tilted downwardly to discharge the debris collected therein.

These and other features and advantages will be better understood by reference to the following detailed description and to the accompanying drawings to which reference is made in the description. In the drawings, similar numbers are used to represent similar parts or components in the different figures, and subscripts are used to designate a plurality of analogous parts or components. Where a plurality of components are referred to without designation of a subscript, the reference is intended in a generic sense.

Referring to the drawing.

Figure 1:
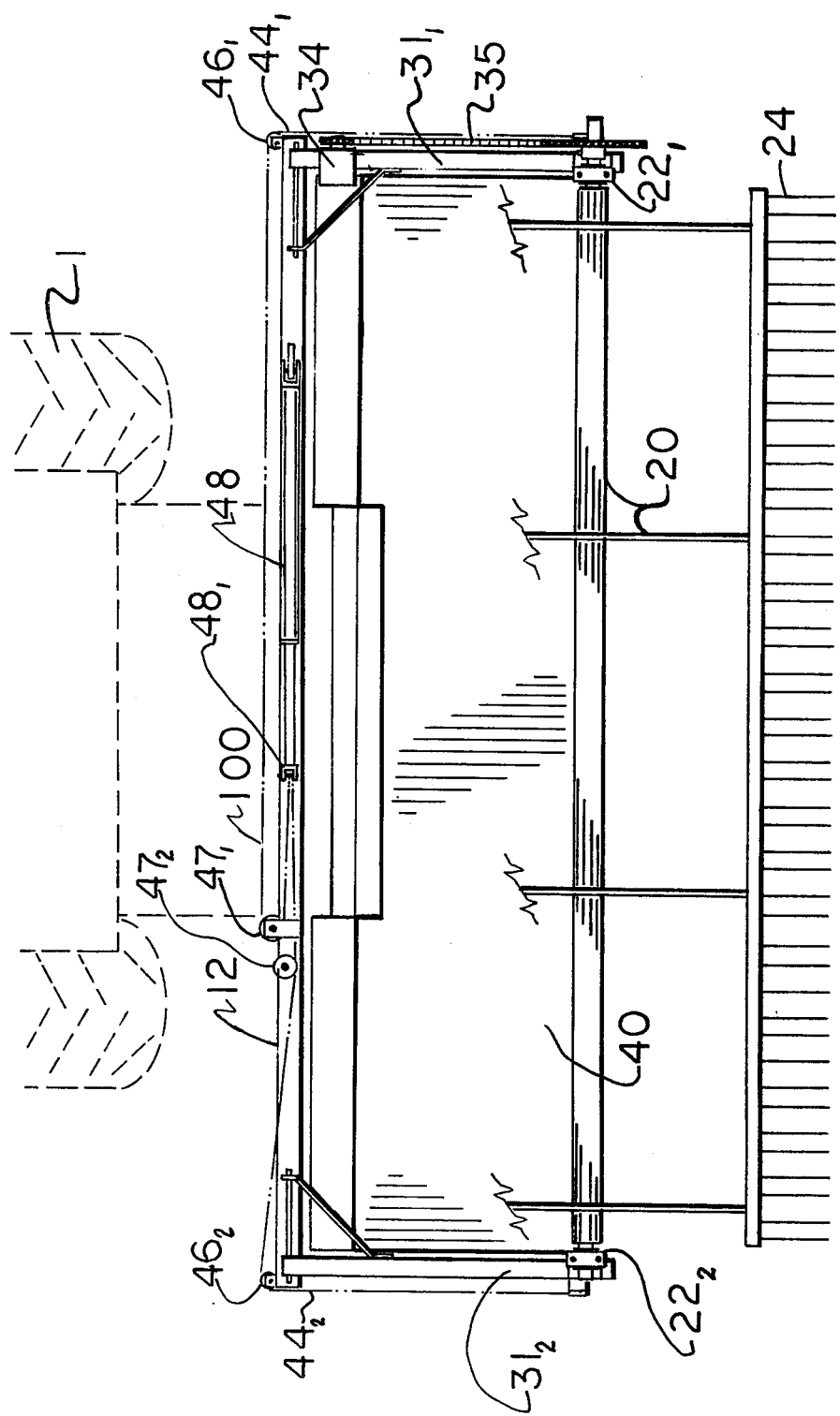
FIG. 1 depicts a plan view of a preferred form of chunk gathering apparatus, or machine, constituted principally of a rotary rake mechanism, a collection means or pan for receiving chunks and other debris dislodged from the soil by the rotary rake mechanism, and means for dumping the collected debris, in accordance with the present invention.

Referring to FIG. 1 generally, there is shown a chunk gathering machine 100 which can be mounted upon and pushed in front of a powered vehicle, suitably a tractor; and preferably a combine 1. The stump gathering machine 100 is thus suitably mounted upon a lift mechanism (not shown) constituting a standard feature on the modern combine; and, via such means, the chunk gathering machine can be elevated as for dumping, and lowered as in use of the mechanism for gathering stumps. The chunk gathering machine is constituted principally of a rotary rake mechanism 20, or means for sweeping chunks, twigs, branches or other debris from the soil, a collection means or pan 40 into which the chunks, twigs, branches or other debris is swept and collected, and means for dumping the collected chunks, twigs, branches or other debris. The rotary rake mechanism 20, in its preferred aspects, is flexibly mounted so that the rake can be raised or lowered into alignment with the pan 40, and the pan 40 is pivotally mounted so that, in its lifted position, it can be swung downwardly to discharge or dump the collected chunks, twigs, branches or other debris.

The rotary rake mechanism 20 and pan 40 are mounted on a rigid frame 10 comprised of a plurality of vertical posts 11, a plurality of horizontal post 12, and a plurality of diagonal struts or posts 13, 14. In general, the frame is thus constituted of a parallelogram formed by top and bottom horizontally oriented posts 12, secured together by alternately spaced vertically oriented posts 11 which may be further braced by additional supports, as desired; inclusive of diagonal struts or posts 13, 14 best shown by reference to FIG. 2. The rotary rake mechanism 20 is mounted atop the frame 10 in essentially cantilever fashion, the rake 21 being mounted on a terminal end of a support arm $31_1$ which, in turn, is pivotally affixed via a hinged connection 32 mounted upon a horizontal post 12 of the support frame 10. The arm $31_1$ can be raised vertically upwardly or downwardly by means of a hydraulic piston unit 33 pivotally mounted via a hinged connection $33_3$ upon a strut 13 of frame 10. Fluid under pressure supplied to the bottom of the cylinder of piston unit 33 thus raises the rake 21 by causing piston $33_1$ to be projected outwardly to apply an upward force upon the arm $31_1$, since the end of the piston $33_1$ is linked to the arm $31_1$ via a link pin connection with the eye $33_2$ located on the lower side of arm $31_1$; and reduction of fluid pressure within the cylinder of piston unit 33 causes withdraw of piston $33_1$ to lower the rake 21. Power for this action is supplied via flexible hose means not shown from the combine 1.

The rake 21 is rotated, or driven in rotary fashion, by means of a motor, e.g. a hydraulic motor 34 supplied by power from the combine 1, located atop the arm 31. Suitably, the ends of the spindle 23 of rake 21 are rotatably mounted within sealed pillow block bearings $22_1$, $22_2$ located within the terminal ends of the arms $31_1$, $31_2$. The outer end of the spindle 22 of rake 21, mounted within pillow block bearing $22_1$, is provided with a fixed gear, or sprocket 36 which is geared via a roller chain 35 to the drive gear or drive sprocket 37.

By preselection of the desired gear ratio and sizes, and size and speed of the motor 34, the rake 21 can be rotated in either direction; in counterclockwise direction (FIG. 2) to sweep debris from the soil to fill the pan 40, or in clockwise direction to disengage the rake 21 from an obstacle with which it may have been engaged.

Figure 3:
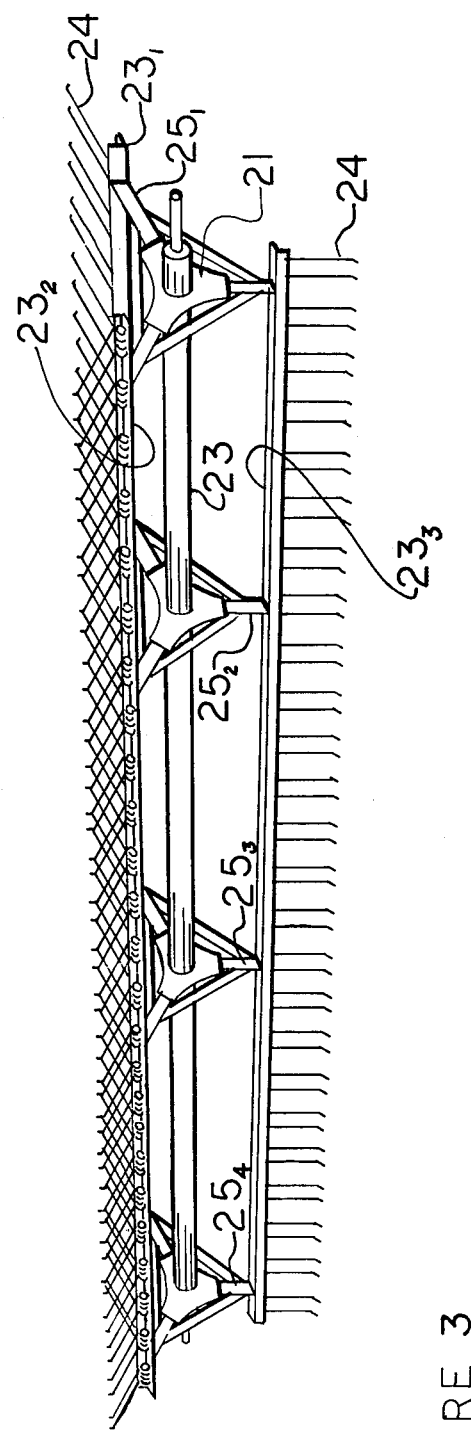
FIG. 3 depicts an isometric, or perspective view, of the rotary rake which is employed to pick up chunks or other debris from the soil.

The details of the rake 21 are best described by specific reference to FIG. 3. Referring to this figure, it will be observed that the rake 21 per se is constituted of a series of three elongate members, or bars $23_1$, $23_2$, $23_3$, suitably of V-shaped cross section from which a plurality of parallelly aligned tymes, or prongs 24 are laterally projected. The elongate members 23 are, in turn, rigidly adjoined to the spindle 23 of rake 21 via a plurality of webb members $25_1$, $25_2$, $25_3$, $25_4$ each formed of three arms spaced 120° apart, braced at the center via an enveloping relatively thick sheath and at the outer ends of the arms via struts. The prongs 24, of substantially equal length, project laterally from inside the outwardly faced V-slots of each of the elongate members 23, each in effect forming a rake separated at an angle of 120° from the next member of the series. Suitably, the prongs 24 are provided with eyes at one of their ends and they are held in place within a given slot by means of a bar passed therethrough. Each individual rake of the series sweeps a given area for each complete rotation of the rake 21.

Figure 4:
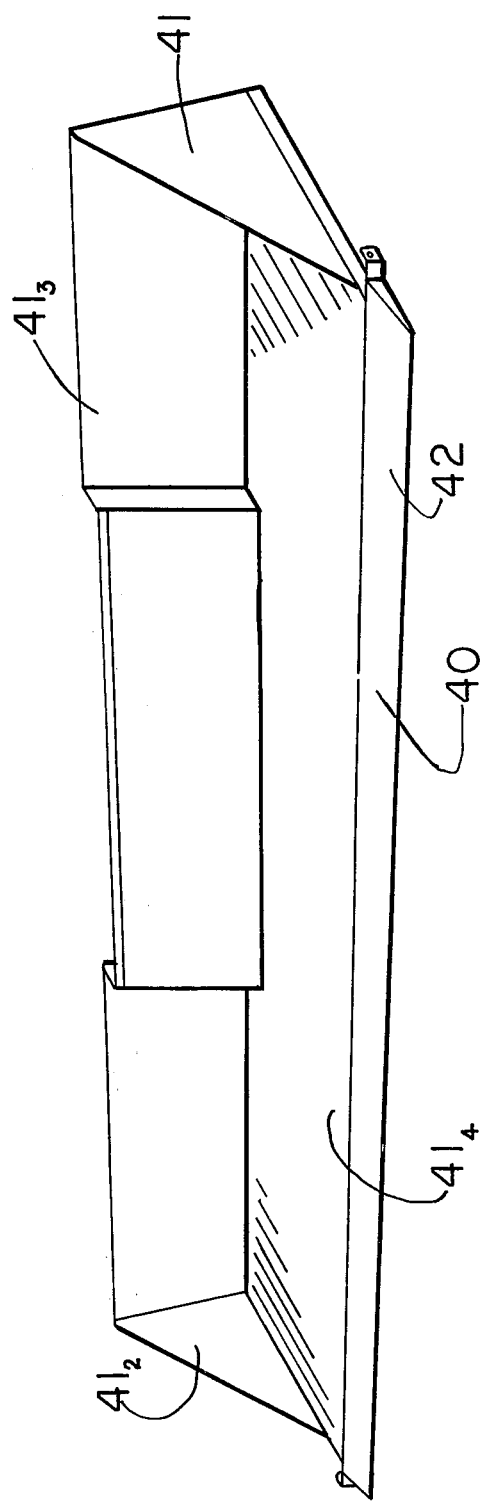
FIG. 4 depicts an isometric, or perspective view, of the collection means, or pan within which the debris is gathered, or collected.

The pan 40 constitutes the means for collection of the debris rake from the soil by the rake 21. The pan 40, as best shown by reference to FIG. 4, is comprised of a relatively broad, elongate flat member, three sides of which are provided with walls $41_1$, $41_2$, $41_3$, and the top and front of the pan are open. The rear wall $41_3$ is adjoined to the floor $41_4$ of the pan and tilted forward toward the leading edge of the pan which is provided with a beveled edge, or scoop 42. The side walls $41_1$, $41_2$ of the pan are inclined downwardly from an adjoining edge of the top of back wall $41_3$ ending at the floor $41_4$ of the pan and trailing side of the beveled edge, or scoop 42. The pan 40 is pivotally connected near its rearward side via pins 43 to the strut 14 so that its leading edge, or scoop 42 can be maintained in a substantial horizontal, or level position, lifted slightly if desired, or tilted downwardly to discharge contents from the pan 40. The pan 40 is maintained in a level position, or tilted downwardly as desired by means of pulley-cable system which can be operated by a hydraulic system actuated from within the combine 1.

Figure 2:
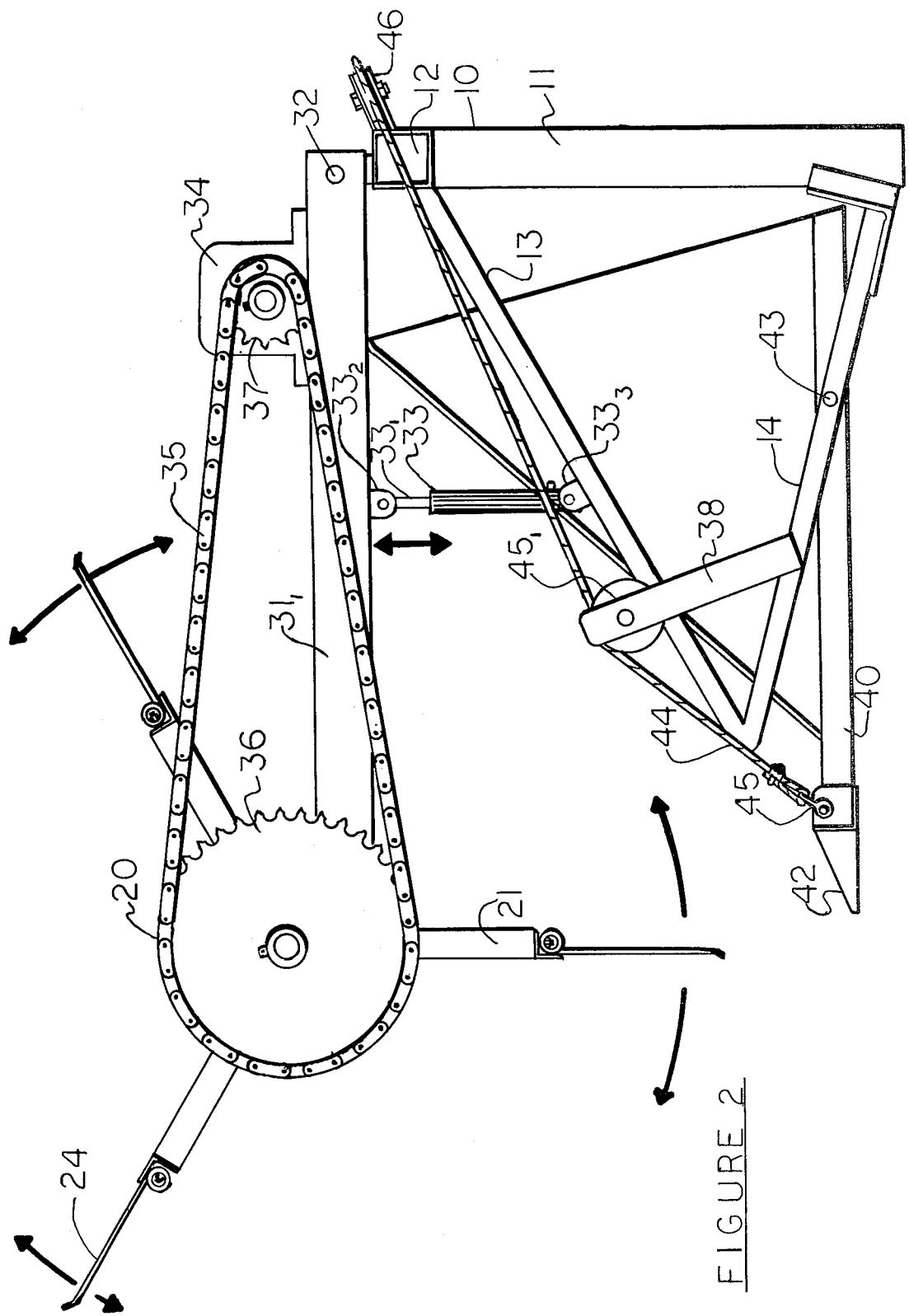
FIG. 2 is a side elevation view of the chunk gathering apparatus, or machine, depicted in the preceeding figure with parts thereof broken away for clarity.

With reference to FIGS. 1 and 2 it will be observed that the pan 40 can be held in a level position by maintaining tension on the cables 44. It will be further observed that the ends of cables 44 are tightly connected via eye bolts 45 to the forward end of pan 40, while the intermediate portions of the cables 44 are passed over pulleys 45, 46, located on a post 38 (affixed to strut 14) and the horizontal post 12, respectively. The opposite ends of these cables 44, after further passage over pulleys $47_1$, and $47_2$, respectively (FIG. 1), are secured to the end $48_1$ of a piston of a hydraulic piston unit 48 located atop horizontal post 12. The piston unit 48 can be actuated from within the combine 1 by means not shown. Extension of the piston of piston unit 48, relaxes tension on cables 44 to permit a downward tilting of the pan 40 to discharge its contents. Conversely, withdrawal of the piston of piston unit 48 increases tension on the cables 44 to raise the pan 40 to an elevated position.

Figure 6:
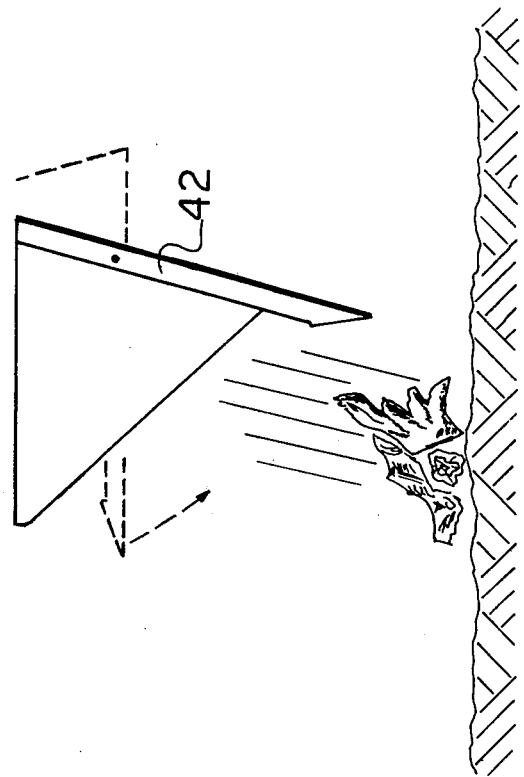
FIG. 6 depicts schematically the dumping of collected chunks or other debris.
Figure 5:
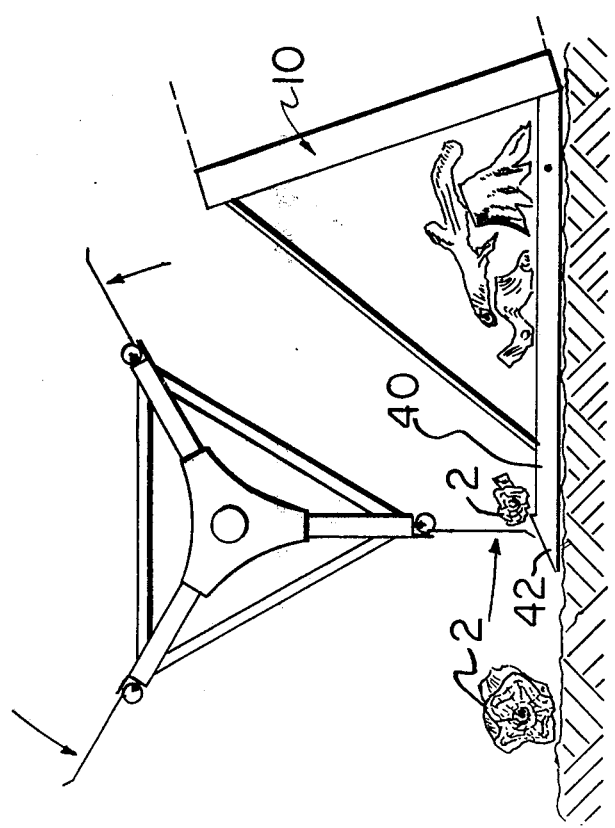
FIG. 5 depicts schematically use of the chunk gathering machine in picking up chunks and other debris.

In initiating an operation, the stump gathering machine 100 is first mounted on the front end of a combine as shown by reference to FIG. 1, the rake mechanism 20 in raised position actuated to turn in counterclockwise rotation as shown by reference to FIG. 2, and the rake mechanism 20 is then lowered to such position that the slightly bent terminal ends of the prongs 24 of rake 21 touch, or nearly touch, the inclined edge of scoop 42 of pan 40 which is positioned at ground level. The combine 1 is then moved forwardly to push the chunk gathering machine along the surface of the ground. In such operation, as shown by reference to FIG. 5, the leading edge 42 of the pan 40 contacts, e.g. chunks 2, and these are swept by the prongs 24 of rake 21 into the confines of pan 40, and therein collected. The chunk gathering machine 100 is then lifted by mechanism on the combine, above the surface level of the ground, transported to a dump site and the chunks 2, or other collected debris, are then dumped by tilting the pan 40 downwardly to discharge the contents thereof as shown by reference to FIG. 6. The chunk pick up and discharge cycle can be repeated ad infinitum.

It is apparent that various modifications and changes, such as in the absolute and relative dimensions of the parts, can be made; and various materials of construction can be used without departing the spirit and scope of the invention as will be apparent to those skilled in the art.

For the most part, the various components of the apparatus are constructed of metals, notably ferrous metals such as iron, iron alloys, steel, stainless steel and the like; or various other metals such as aluminum, brass, copper, bronze and the like.

Having described the invention, what is claimed is:

1. Apparatus for mounting upon an elevator, or lift mechanism located on the front end of a tractor, combine or other powered land vehicle for use in gathering stumps, twigs, branches and other debris from the soil which, in combination, comprises
    a rigid frame constituted of vertical posts, horizontal posts, and fixed support struts, said frame being attached directly to the front end of said vehicle and capable of being vertically lifted by said vehicle lift mechanism,
    a rotary rake mechanism capable of continuous full rotation mounted upon said frame, said rotary mechanism including a rotary rake mounted upon an arm which is pivotally attached via an end to said rigid frame, a motor mounted on said arm operatively associated with said rotary rake for supplying power for rotation of same for sweeping the surface of the soil when the rotary rake is lowered into contact therewith, and means mounted on said frame for raising and lowering said rake relative to the soil for sweeping same,
    an open front pan pivotally mounted on said rigid frame independent of, and below the rotary rake of said rotary rake mechanism for moving along the surface of soil for collecting the debris swept therein from the surface of the soil via rotation of said rotary rake when said rake is lowered into contact with the soil, and
    a means for pivoting the open front end of said pan downwardly for dumping said collected debris from the pan when raised by the lift mechanism located on the front end of said powered land vehicle.

2. The apparatus of claim 1 wherein the rotary rake is mounted on an arm constituted of a pair of parallel bars of substantially equal length across the non-pivotally attached ends of which the rotary rake is mounted, the pivotally attached ends of said bars are mounted upon and supported by the vertical and horizontal posts of said frame, and the rotary rake of said rotary rake mechanism is raised and lowered by hydraulic motor means mounted upon a fixed support strut.

3. The apparatus of claim 2 wherein the motor is mounted atop one of the bars constituting said arm of said rotary rake mechanism and the output shaft of said motor is operatively geared with said rotary rake for rotation of same.

4. The apparatus of claim 2 wherein the rotary rake of said rotary rake mechanism is constituted of a central spindle, a plurality of elongated bars in parallel relation thereto spaced substantially equidistant one from the other and held in place via a plurality of webbed members, and a plurality of lateral prongs entended in parallel relationship from each of said elongated bars, said rotary rake being pivotally mounted upon the non-pivotally attached ends of the pair of parallel bars of substantially equal length constituting said arm, one end of the spindle being provided with a sprocket, and including a motor mounted atop an adjacent bar constituting a portion of the arm of said rotary rake mechanism, the output shaft of said motor being provided with a drive sprocket which is operatively geared to the sprocket of said spindle which can be driven to impart a rotary motion to said rotary rake.

5. The apparatus of claim 1 wherein the open front pan is provided with a beveled leading edge, the sides and back of said pan are provided with walls, the top of the pan is open, and the front end of the pan can be raised to a position level with the surface of the soil for collecting debris swept therein by said rotary rake, and the rotary rake can be lifted and the front end of the pan tilted downwardly to discharge collected debris.

6. The apparatus of claim 5 wherein the front end of said pan can be raised and lowered via means of a cable attached thereto.

7. The apparatus of claim 1 wherein the frame is constituted of vertical posts, horizontal posts, and fixed support struts extended therefrom, a hydraulic piston is mounted on said frame, the pan is pivotally attached to said fixed support struts of said frame, the pan is provided with a beveled leading edge, the sides and rear of the pan are provided with walls, the top of the pan is open, cables are secured to the front end of said pan, passed over pulleys supported on said struts, frame and operatively secured to the hydraulic piston whereby the pan via action of said piston can be raised to a level position for collecting debris swept therein by said rotary rake, and the rotary rake can be lifted and the front end of the pan tilted downwardly via action of said piston to discharge debris from the pan.

8. The apparatus of claim 7 wherein the hydraulic piston which controls the pan via action upon the cables can be actuated from within the combine.

9. Apparatus for mounting upon an elevator, or lift mechanism located on the front end of a tractor, combine or other powered land vehicle for use in gathering stumps, twigs, branches and other debris from the soil which, in combination, comprises
    a rigid frame constituted of vertical posts, horizontal posts and support struts, said frame being attached directly to the front end of said vehicle and capable of being vertically lifted by said vehicle lift mechanism,
    a rotary rake mechanism capable of continuous full rotation mounted upon said frame, said rotary rake mechanism including a rotary rake mounted upon an arm which is pivotally attached via an end to said rigid frame, the arm of the rotary rake mechanism on which the rotary rake is mounted being constituted of a pair of parallel bars of substantially equal length across the non-pivotally attached ends of which the rotary rake is mounted, the pivotally attached ends of said bars being mounted upon and supported by the vertical and horizontal posts of said frame, and the rotary rake of said rotary rake mechanism being raised and lowered by hydraulic motor means mounted upon a support strut, a motor mounted atop one of the bars of said arm, the output shaft of said motor being operatively geared with said rotary rake for rotation of same for sweeping the surface of the soil when the rotary rake is lowered into contact therewith, a hydraulic piston mounted on said frame for raising and lowering said rake relative to the soil for sweeping same, an open front pan pivotally mounted on said frame independent of and below the rotary rake of said rotary rake mechanism for moving along the surface of soil for collecting the debris swept therein from the surface of the soil via rotation of said rotary rake when said rake is lowered into contact with the soil, and a means for pivoting the open front end of said pan downwardly for dumping said collected debris from the pan when raised by the lift mechanism located on the front end of said powered land vehicle.

10. The apparatus of claim 9 wherein the rotary rake of said rotary rake mechanism is constituted of a central spindle, a plurality of elongated bars in parallel relation thereto spaced substantially equidistant one from the other and held in place via a plurality of webbed members, and a plurality of lateral prongs are entended in parallel relationship from each of said elongated bars, said rotary rake being pivotally mounted upon the non-pivotally attached ends of the pair of parallel bars of substantially equal length constituting said arm, and the open front pan is provided with a beveled leading edge, the sides and back of said pan are provided with walls, the top of the pan is open, and the front end of the pan can be raised to a position level with the surface of the soil for collecting debris swept therein by said rotary rake when said rake is lowered into contact with the soil, and the rotary rake can be lifted and the front end of the pan tilted downwardly to discharge collected debris.

* * * * *